Feb. 26, 1963 W. A. RINGLER 3,079,064
CARTON
Filed Oct. 24, 1955 6 Sheets-Sheet 1

INVENTOR.
WILLIAM A. RINGLER
BY
Marechal, Biebel, French & Bugg
ATTORNEYS

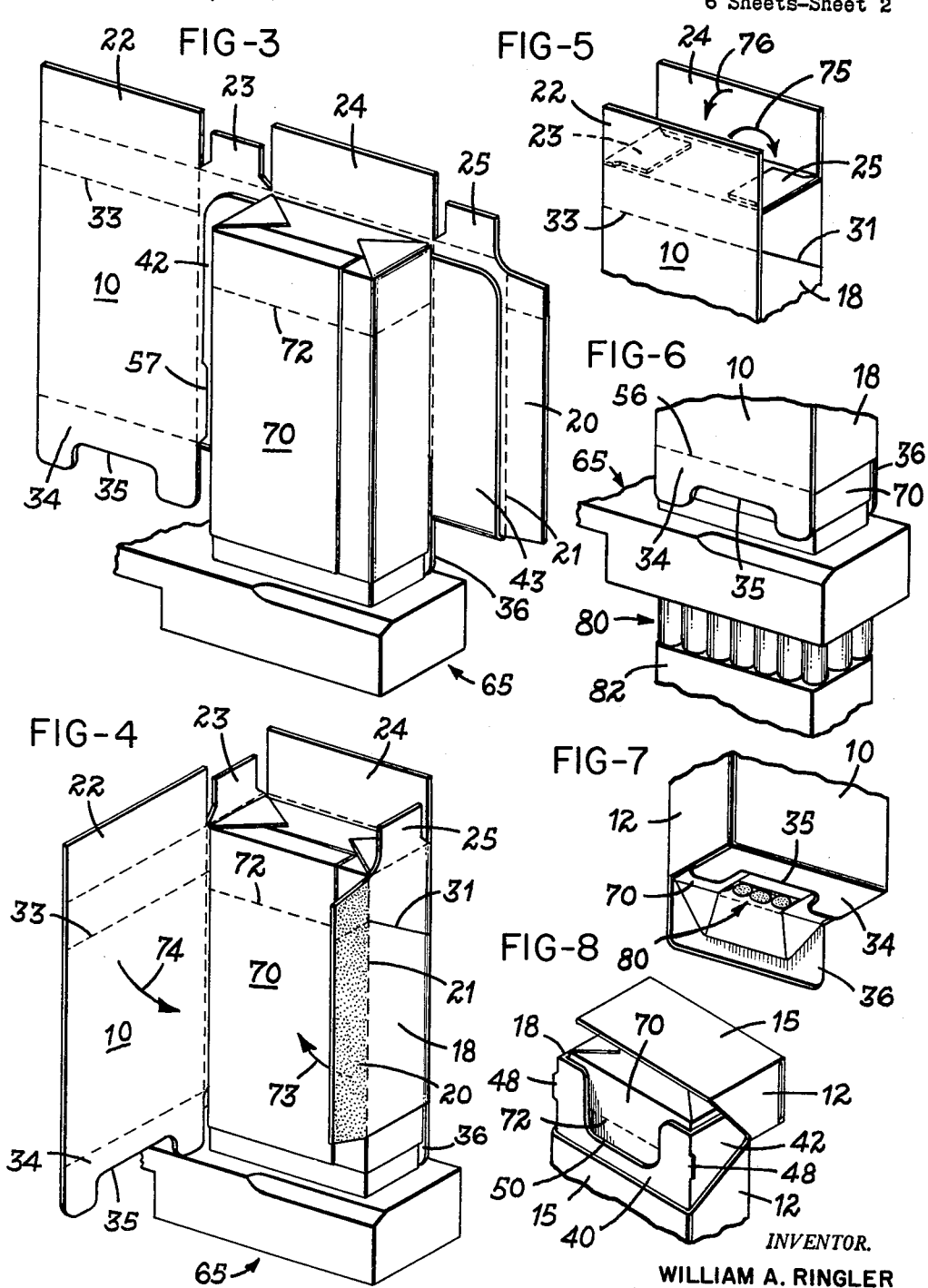

Feb. 26, 1963 W. A. RINGLER 3,079,064
CARTON
Filed Oct. 24, 1955 6 Sheets-Sheet 3

INVENTOR.
WILLIAM A. RINGLER
BY
Marshall, Biebel, French & Bugg
ATTORNEYS

Feb. 26, 1963  W. A. RINGLER  3,079,064
CARTON
Filed Oct. 24, 1955  6 Sheets-Sheet 4

INVENTOR.
WILLIAM A. RINGLER
BY
Marchal, Biebel, French & Bugg
ATTORNEYS

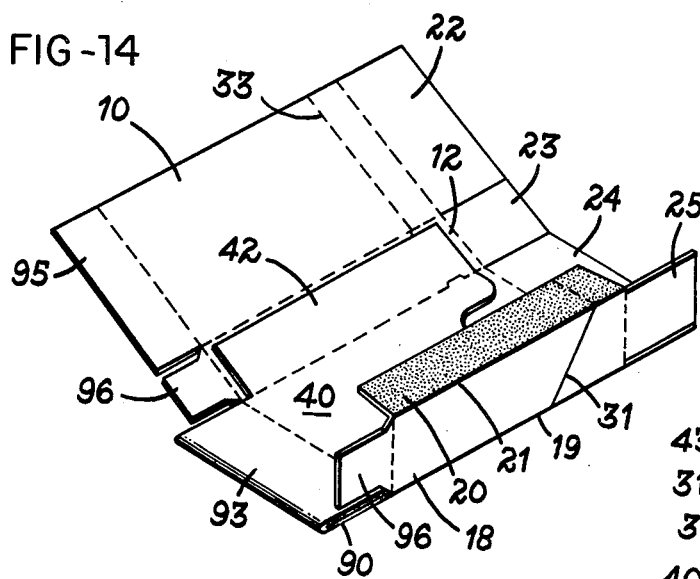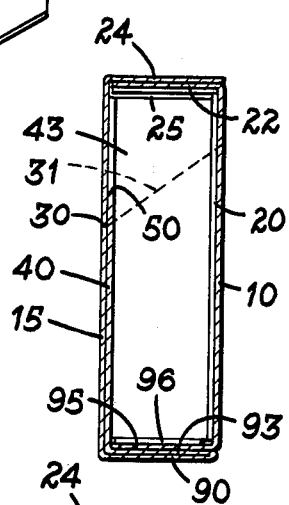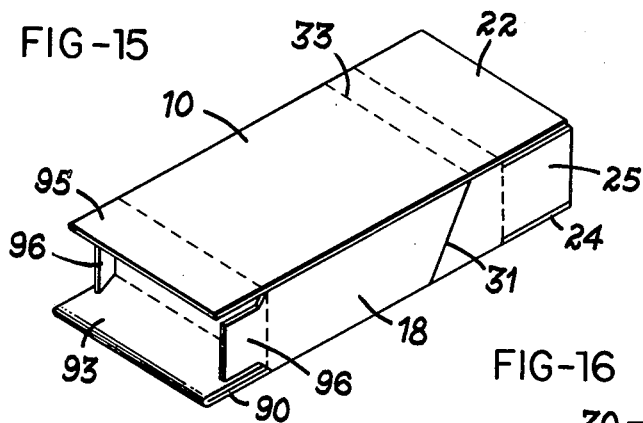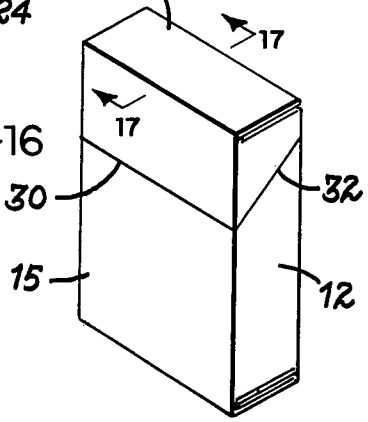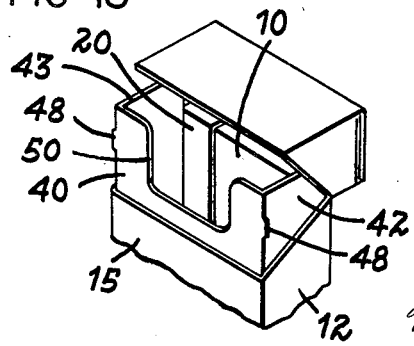

Feb. 26, 1963 W. A. RINGLER 3,079,064
CARTON
Filed Oct. 24, 1955 6 Sheets-Sheet 6

INVENTOR.
WILLIAM A. RINGLER
BY
Marshall, Biebel, French & Bugg
ATTORNEYS

United States Patent Office 3,079,064
Patented Feb. 26, 1963

3,079,064
CARTON
William A. Ringler, Wayne, Pa., assignor, by mesne assignments, to Diamond National Corporation, a corporation of Delaware
Filed Oct. 24, 1955, Ser. No. 542,368
10 Claims. (Cl. 229—44)

This invention relates to a carton, particularly to a carton having a reclosable lid.

The carton provided by this invention is intended primarily for use in packaging cigarettes and similar rod-like articles, although this carton could be readily adapted to the packaging of other materials. There are in present use many cigarette packing machines manufactured by The American Machine and Foundry Company of New York and known commercially as the AMF 3-79 standard cigarette packer, such machines being generally as shown in United States Patent 1,926,192. These machines are at present used to provide the well known cigarette package comprising an inner foil wrap and an outer paper pouch which is in turn covered with a cellophane wrapper.

Cigarette cartons having integral hinged lids heretofore proposed have met with little commercial success largely due to the fact that they are, generally speaking, not adaptable to the foldijng operations of the AMF standard packing machine, and the conversion of these machines for use with such cartons has either not been possible or has been prohibitive from the standpoint of cost. In spite of the fact that a reclosable lid type of carton provides many advantages from the standpoint of neatness of appearance and resistance to crushing during handling and use the packaging industry, particularly with regard to cigarette packaging, has largely continued the use of the present well known cigarette package and has not enjoyed the paperboard carton type of package.

It is therefore a primary object of this invention to provide a blank for forming a carton having a reclosable lid which is adapted to the high speed folding and packaging operations of folding and packaging machines now in general use.

Another object of this invention is to provide such a blank which is simple and economical to manufacture, yet which provides a carton having a neat and sturdy outward appearance.

A further object of the invention is to provide in such a carton an inner member comprised of three panels which include inner side panels hinged to the lower edges of the main or outer side wall panels of the carton for lateral folding with respect to the lower edge of the outer side panels to a position wherein the inner member is superimposed upon the main portion of the carton blank, leaving the inner panels free to slide relative to the outer panels during folding of the carton blank into tubular form.

An additional object of the invention is to provide such a carton wherein only the inner front panel is adhered to the outer member, leaving the inner side panels free to slide relative to the outer member during the folding operations.

Another object of this invention is to provide a package for cigarettes and like articles wherein the articles are completely covered by a sheet of foil, and wherein the foil enclosed articles are packaged in a paperboard carton having a reclosable lid, and to provide a blank of paperboard material which may be folded by high speed packaging machines to provide such a package.

A further object of this invention is to provide a method of forming a carton having a reclosable lid by providing a blank including inner and outer members, and folding the inner member into superposition upon the outer member, and then folding the blank about the mandrel into open tubular form and securing the blank in this form.

Other objects and advantages of the invention will be apparent from the following description, the accompanying drawings and the appended claims.

In the drawings—

FIG. 3 is a perspective view of the blank preparatory to folding thereof about a mandrel on a high speed machine for packaging cigarettes and the like;

FIG. 4 is a perspective view similar to FIG. 3 showing an intermediate folding step;

FIG. 5 is a somewhat schematic view showing the folding operations on the top flaps of the carton;

FIG. 6 is a perspective view of the loading of the carton through the mandrel;

FIG. 7 is a schematic illustration of the closing of the bottom flaps on the carton;

FIG. 8 is a partial perspective view of the completed carton with the reclosable lid in an open position;

FIG. 14 is a perspective view of the blank of FIG. 11 during an intermediate step in the folding thereof into open tubular form;

FIG. 15 shows the blank of FIG. 11 in tubularly folded form preparatory to forming the top and bottom walls of the carton;

FIG. 16 is a perspective view of the completed carton formed from the blank of FIG. 11;

FIG. 17 is a section through the carton taken on line 17—17 in FIG. 16;

FIG. 18 is a partial view similar to FIG. 16 with the reclosable lid in an open position;

Figure 1:
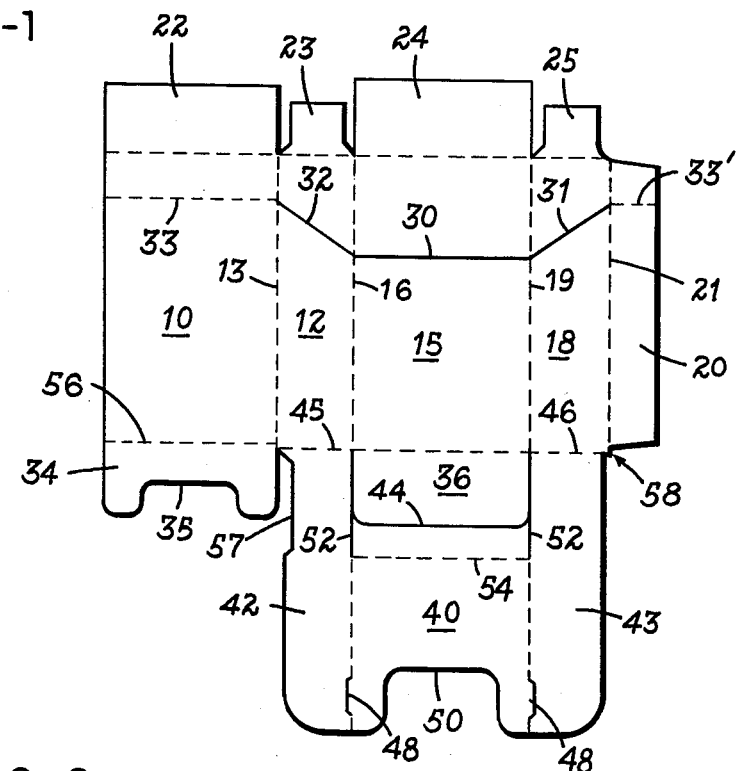
FIG. 1 is a plan view of a blank for forming a carton in accordance with the invention.

Referring to the drawings, which illustrate a preferred embodiment of the present invention, the blank includes a rear panel 10 at one end thereof having an outer side panel 12 hinged to one side of panel 10 along the score line 13. An outer front panel 15 is connected to the opposite side of panel 12 along line 16, and the other outer side panel 18 is attached to the opposite side of panel 15 along line 19. A glue flap 20 is hinged at 21 to the other edge of panel 18 for connection with rear panel 10 to retain the blank in tubular form. A series of top flaps 22, 23, 24 and 25 are independently hinged to the upper edges of panels 10, 12, 15 and 18, respectively, for forming a top wall on the carton.

The outer panels, which constitute the main portion of the blank in FIG. 1, are provided with slitted and scored portions for the formation of a reclosable lid on the completed carton. A continuous slit is provided through panels 12, 15 and 18 including a central portion 30 extending horizontally across front panel 15 parallel to and spaced below the upper edge thereof, and slanted or biascut portions 31 and 32 extending from opposite ends of slit portion 30 upwardly at an angle across panels 12 and 18, toward but spaced below the upper edges of these outer side panels. A score line 33 extends transversely of rear panel 10, spaced from the upper edge thereof and intersecting the end of slit portion 32, and a score line 33' is also provided across glue flap 20, intersecting the end of slit portion 31 and located on the glue flap to register with score line 33 when the blank is folded into tubular form. Thus, the continuous slit and the associated score lines 33 and 33' divide the main portion of the blank into upper and lower sections, with the sections of the blank between the upper edge thereof and the slit and score lines providing front, side, rear and top walls of a reclosable lid which is hinged to the carton along line 33. The portions of the blank below the slit and score line are foldable to provide an open top box to which the reclosable lid is integrally hinged.

At the bottom of rear panel 10 a bottom flap 34 is articulated, and is provided with a cutaway or relieved portion 35 at its free end. A second bottom flap 36 is articulated to the lower edge of panel 15, and surrounding this flap is a series of inner panels providing an inner member for the completed carton. Thus, the inner member includes an inner front panel 40 and inner side panels 42 and 43. A continuous slit 44 separates flap 36 from all adjacent portions of the inner member, and the inner member is integrally hingedly connected to the outer member along score lines 45 and 46 separating outer and inner side panels 12 and 42, and outer and inner side panels 18 and 43, respectively. Thus, the entire inner member is foldable as a unit along lines 45 and 46 into superposition upon the outer member, and the height of the inner panels is such that they extend across slit portions 30, 31 and 32 and terminate slightly beneath the upper edge of the outer panels 12, 15 and 18. A portion of the fold lines separating inner front panel 40 from the inner side panels 42 and 43 is slit and offset somewhat adjacent the outer edge of the blank, to provide tabs 47 extending outwardly from opposite sides of panel 40. These tabs serve to retain the lid of the carton in its normally closed position as will presently be described. Also, the free upper edge of inner front panel 40 is provided with a central cutaway portion 50 which affords an access opening in the completed carton.

Figure 2:
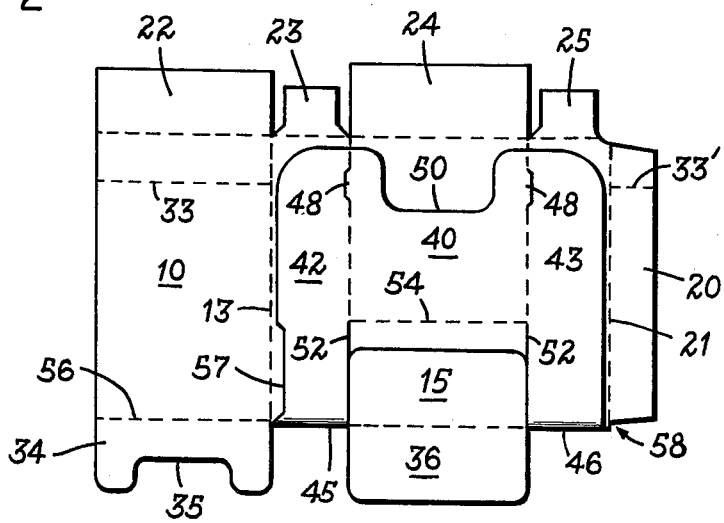
FIG. 2 is a plan view of the blank with the inner member superimposed upon the main portion of the blank.

In order to adapt the carton of the present invention to high speed packaging operations it is desirable to fold the inner member onto the outer member, as shown in FIG. 2, by the use of automatic folding equipment either separate from or in combination with a high speed packaging machine. Thus, since it is desirable that flap 36 remain coplanar with panel 15 for further folding operations, slits 52 separate a lower portion of inner front panel 40 from the adjacent side panels 42 and 43, and a score line 54 is provided in panel 40 connecting the ends of slits 52 as shown in FIGS. 1 and 2. When the blanks are die cut from sheet material, paperboard, for example, the impression made by the die to provide score 54 will cause the sheet material to draw along that score line, and since the remainder of the lower edge of panel 40 is free, due to the cutting of slits 44 and 52, that portion of panel 40 between these slits and score line 54 will be drawn toward the score line and thus separated from flap 36. This insures complete freedom between flap 36 and the inner member and prevents that flap from being drawn out of its flat position upon folding of the inner member onto the outer member of the blank.

Furthermore, to provide a tight and crush resistant bottom wall on the carton, the score line 56, along which flap 34 is articulated to rear panel 10, is offset slightly from score lines 45 and 46. Also, a cutaway portion 57 is provided in the free side of inner panel 42, and the lower edge of glue flap 20 is terminated somewhat above score line 46, as indicated at 58. The effect of this construction, which will be discussed more fully later on, is to provide for folding of flap 34 within the bottom of the carton.

Figure 9:
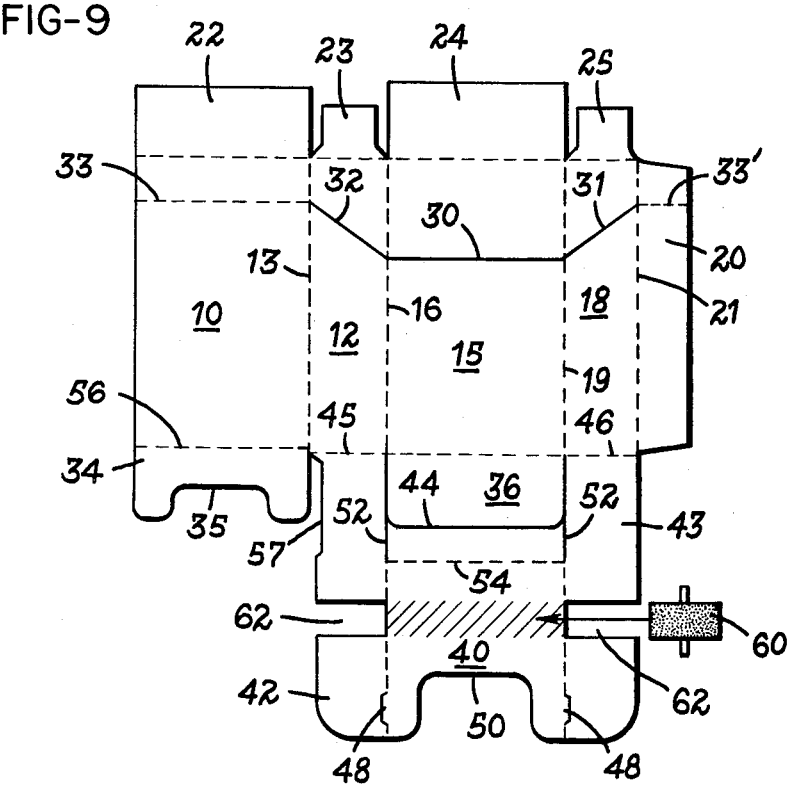
FIG. 9 is a plan view of a modified blank in accordance with the invention.

The modified blank of FIG. 9 is particularly adaptable to use in high speed folding machines which perform a preliminary folding operation on the blank to prepare it for use in high speed packaging machines such as the AMF 3-79 packer mentioned above. Like reference numerals have been used to indicate parts in the blank of FIG. 9 which are the same as those shown in FIGS. 1 and 2. Thus, this blank is moved relative to a glue wheel 60 and a suitable adhesive is applied to the shaded area of panel 40. Cutaway portions 62 are formed in panels 42 and 43 to be in line with the glue wheel, and thus as the inner member is folded along lines 45 and 46 into superposition upon the main portion of the blank, as indicated in FIG. 2, the inner member is adhered only to the outer front panel 15, and the side panels of the inner member are free to move relative to the outer side panels 12 and 18 during folding operations in the packaging machine.

Figure 10:
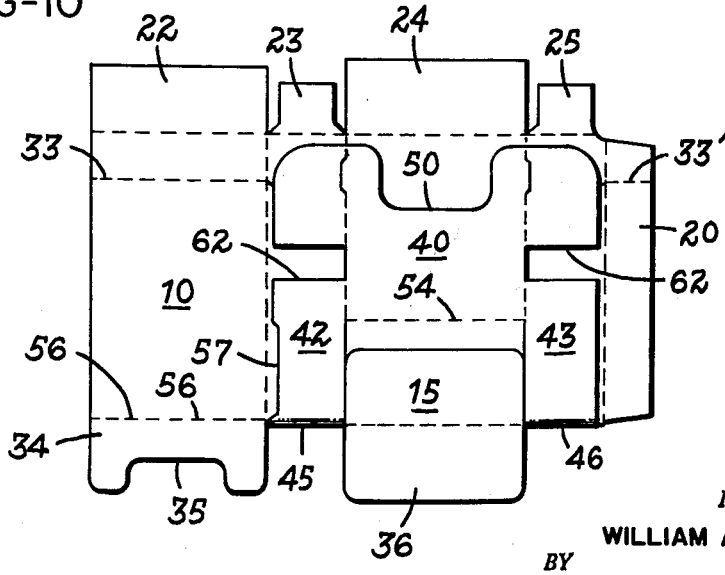
FIG. 10 is a plan view of the blank of FIG. 9 with the inner member superimposed upon the main portion of the blank.

The blanks, either in flat condition as in FIGS. 1 and 9, or in the flat folded assembled condition of FIGS. 2 and 10, are readily adaptable to feeding from a magazine of a packaging machine. In the former instance a preliminary fold is made in the blank feeding mechanism of the packaging machine to superimpose the inner blank member upon the outer member. Or, the blanks may be pre-folded in a high speed machine and then placed in the packaging machine magazine, as in the latter instance. In either event, a series of only four folds are required to "tube" the blank, that is to assemble it in open tubular form. The upper portions of the inner member overlie the continuous slit through panels 12, 15 and 18, and the free upper edges of the inner members are positioned immediately below the upper edges of these panels, providing continuations of the front and side panels of the open top box referred to above which extend into the closable lid of the carton.

Figure 22:
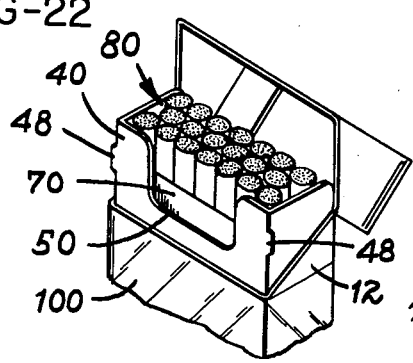
FIG. 22 is a partial perspective view of the package completely opened.

The sequence of steps shown in FIGS. 3-7 illustrates the forming of a carton from the blanks shown in FIGS. 2 and 10. These steps may be performed by high speed packaging machines, for example, of the type shown in above mentioned United States Patent 1,926,192. As previously explained, the blanks are fed from a magazine, and as the inner member of the blank is folded onto the outer member bottom flap 35 remains coplanar with the outer front panel 15. FIG. 3 shows a hollow mandrel 65 of the type shown in the above mentioned patent, for example, in Figs. 33-37 thereof. A sheet of foil 70 having a perforation 72 extending across one of its ends is wrapped about the mandrel in the usual manner. Such a foil sheet is shown in plan in FIG. 22 of this application.

The carton blank, with the inner and outer members folded together, is positioned against the mandrel with the inner front panel 40 abutting one of the larger flat faces thereof and overlying foil sheet 70, preferably on the side of the foil, opposite from the overlapped edges thereof. The side panels of the blank are then folded around the smaller sides of the mandrel, as shown in FIG. 4. During this folding step there will be a slight amount of relative movement between facing inner and outer side panels, but since the inner panels are of less width than the outer side panels, and since they are not fixed to the outer side panels, there is no resistance to such sliding movement. Suitable adhesive is applied to the outer face of glue flap 20, as indicated by the dotted portions in FIG. 4, and the glue flap is then folded along line 21 onto the other large side of the mandrel as indicated by arrow 73, and finally rear panel 10 is folded in the direction of arrow 74 into contact with glue flap 20 for adherence thereto. Thus the blank is folded into open tubular form about the mandrel.

The top wall of the carton is next formed by folding flaps 23 and 25 inwardly over the foil, as shown in FIG. 5. Flap 22 is then folded across the end of the carton in the direction of arrow 75, and finally flap 24 is folded over in the direction of arrow 76 and adhered to the outer surface of flap 22 by a suitable adhesive (not shown). With the top wall of the carton formed, the articles to be packaged, for example cigarettes indicated generally at 80 in FIG. 6, are pushed into the interior of the hollow mandrel by a plunger 82, and the stroke of the plunger is extended until the cigarettes abut the now closed top wall of the carton and push the entire assembly of carton, foil and cigarettes off the hollow mandrel.

The sides of the foil sheet, which extend below the lower edges of side walls 12 and 18, are next tucked inwardly over the open bottom of the carton, and the flap 34 is folded over as shown in FIG. 7 to fold the part of the foil overlying that flap across the bottom of the carton. As previously mentioned, flap 34 is arranged, by the offsetting of fold line 56 and the adjacent edges of inner side panels 42 and 43, to be folded within the bottom of the carton. Finally, flap 36 is folded over across the bottom of the carton, carrying with it the remaining portion of the foil. Flaps 36 and 34 are secured together by a suitable adhesive (not shown) to complete the forming of the carton. Due to the provision of cutaway portion 35 in flap 34 when that flap is folded downwardly it contacts only portions of the foil sheet which have been tucked in from the sides, and when flap 36 is folded over the portion of the foil folded in by this movement contacts the foil already folded over and none of the carton material comes into contact with the contents packaged within the carton. Furthermore, parts of the lower folded ends of the foil are secured between the carton flaps 34 and 36, as will be apparent from FIG. 7. These flaps are adhered to each other in the finished package, and thus the foil is secured within the carton without the need of any additional gluing.

Figure 19:
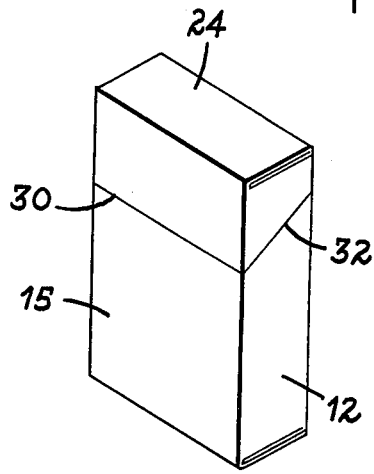
FIG. 19 shows a completed carton such as formed from the blanks shown in FIGS. 1 and 9.

The completed carton is shown in FIG. 19 with the lid in its closed position, and in FIG. 8 the upper portion of the carton is shown with the lid swung to its open position. It will be noted that the cutaway portion 50 provides an access opening in the upper frontal edge of the open top box portion of the carton. The height of panel 40 is such that the free upper edges thereof at the corner of the box intersect the arc through which the front wall of the lid swings about hinge line 33, and thus a certain amount of force is required to slide the front wall of the lid over the upper edge of the box. In addition, tabs 48 engage the front corners of the lid and assist in retaining it in its normally closed position.

Figure 11:
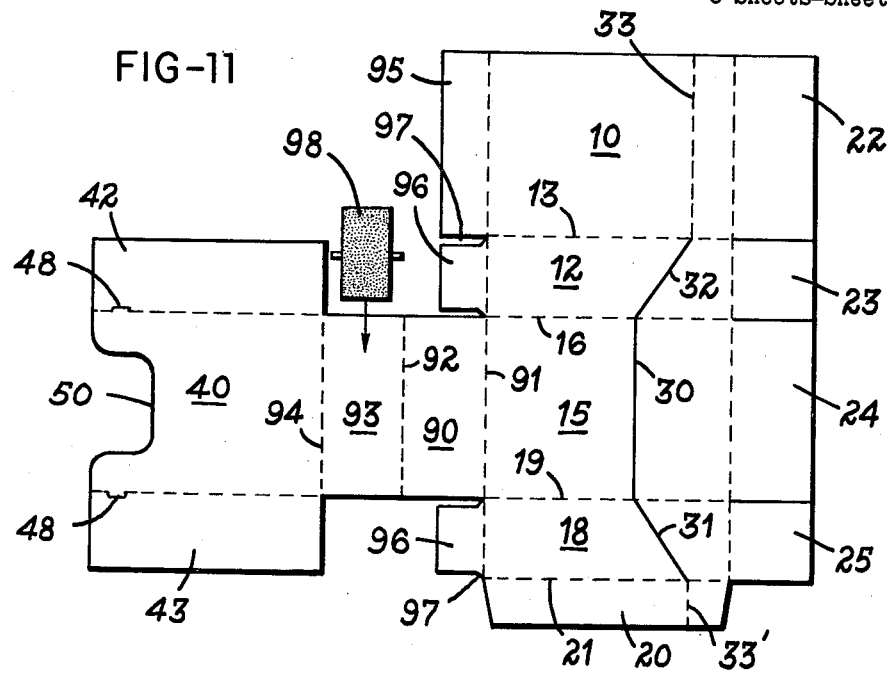
FIG. 11 is a plan view of another modified blank.

Another blank in accordance with the invention is shown in FIG. 11, wherein panels and flaps identical to panels and flaps in the blank of FIG. 1 have been given the same reference numerals. In the blank of FIG. 11 a modified connection is provided between the inner and outer members, and includes an outer bottom flap 90 hinged at 91 to the lower edge of panel 15, and having an integral connection along its opposite side at 92 with an inner bottom flap 93. The latter flap is in turn hinged at 94 to the inner front panel 40. The other bottom closure elements of this blank include a rear bottom flap 95 which is of less width than the panels 90 and 93, and which may be provided with a cutaway portion such as shown at 35 in the blank of FIG. 1, if so desired. Also, side bottom flaps 96 are provided, and include cut-in portions 97 adjacent their connections with the side panels 12 and 18 to provide for folding of the flaps 96 within the bottom of the carton.

Figure 12:
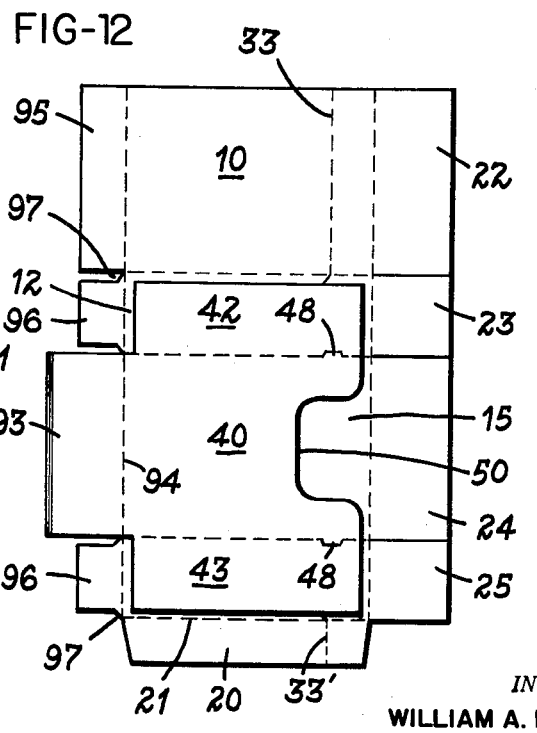
FIG. 12 shows the blank of FIG. 11 with the inner member folded onto the outer member.

The modified blank of FIG. 11 may be used in the same manner as the other blanks previously mentioned, and in folding the inner member onto the outer member of the blank the inner panels 40, 42 and 43 and the inner bottom flap 93 are all folded as a unit along score line 92 into superposition upon the outer panels and outer bottom flap 90, as shown in FIG. 12. Prior to this folding a suitable adhesive may be applied to panel 93 if so desired by a glue wheel indicated generally at 98 in FIG. 11. The separation between the inner and outer members of the blank adjacent flap 93 provides for application of adhesive to this flap only.

FIGS. 14 and 15 show in a general way the folding of the blank of FIG. 11 and FIG. 12 into open tubular form, for instance by folding the blank around a mandrel as described in connection with FIGS. 3 and 4. Thus, the side panels are folded upwardly with respect to the front panels, then the glue flap 20 is folded around the mandrel (not shown in FIG. 14) and finally rear panel 10 is folded upon and adhered to flap 20. The top wall of the carton may then be formed by folding the top flaps 22–25 inwardly in the same manner as shown in FIG. 5, and the articles to be packaged may be placed within the carton in the same manner as described in connection with FIG. 6, and finally the bottom flaps may be folded to provide a bottom wall substantially as described above in connection with FIG. 7.

The completed carton is shown in FIG. 16, and a vertical section through this carton is shown in FIG. 17, indicating the position of the inner member within the carton, and the relative position of the bottom flaps in forming the bottom wall.

FIG. 18 shows the lid of the carton of FIG. 16 in an open position, and illustrates the overlapping relation of rear panel 10 and glue flap 20, as well as showing the outwardly extending tabs 48 which engage the side walls of the lid to assist in retaining the lid in its closed position. It is to be noted that in connection with this carton the upper edges of front panel 40 again extend within the lid substantially to the top wall thereof and intersect the path of movement of the front wall of the lid, thereby requiring that a certain amount of intentional pressure be exerted to swing the lid between its open and closed positions.

Figure 13:
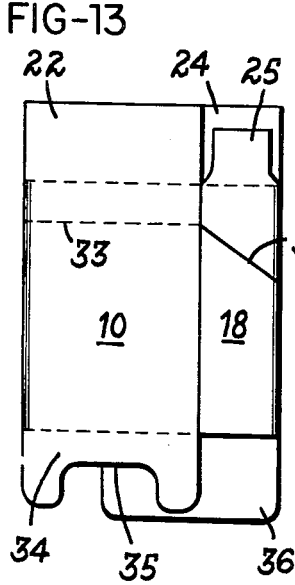
FIG. 13 is a somewhat schematic illustration of the folding of the carton blanks provided by this invention into flat tubed form for storage and/or shipping.

So far, the present invention has been described in connection with cigarette packaging machines, but it is to be understood that the cartons provided by the invention are adaptable to use in any number of high speed packaging machines. Thus, for example, the blanks of FIGS. 2, 10 or 12 can be assembled into flat folded tubular form for shipping and/or storage, and in this form the blanks are adaptable to use in high speed packaging machines which erect the flat tubed blank, form the bottom wall thereon, fill the erected carton, and finally form the top wall from the top flaps thereof. FIG. 13 illustrates the blank of FIG. 1 assembled in such flat folded or flat tubed form, and it is apparent that the blank of FIG. 12 can be assembled in the same manner. This folding can be performed by high speed gluing and folding machines which apply a suitable adhesive to the glue flap 20, fold the glue flap and adjacent side panels over onto the front panels, and then fold the rear panel 10 onto the glue flap for adherence thereto.

Figure 21:
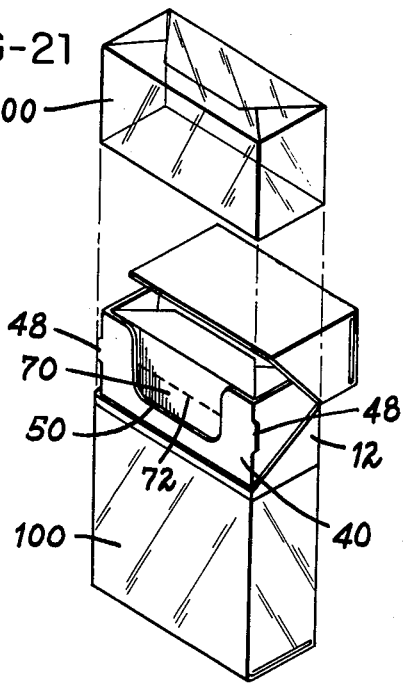
FIG. 21 shows the package in an intermediate step of opening.
Figure 20:
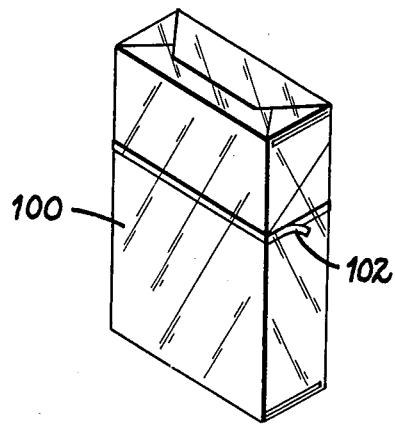
FIG. 20 illustrates a cigarette package incorporating either of the cartons shown in FIG. 16 or FIG. 19.

The carton provided by this invention is particularly adaptable to the packaging of cigarettes, and FIG. 20 illustrates such a cigarette package in which the closed carton is covered with an outer wrapper 100 of regenerated cellulose, cellophane or similar suitable transparent material. A tear strip 102 is preferably incorporated in this wrapper in the usual manner, and is located in the completed package to extend across the central slit portion 30 and around the periphery of the carton at the same level as slit 30. Thus, when the tear strip is pulled the portion of the outer wrapper above this strip may be removed, as shown in FIG. 21, and the lid of the carton opened.

Figure 23:
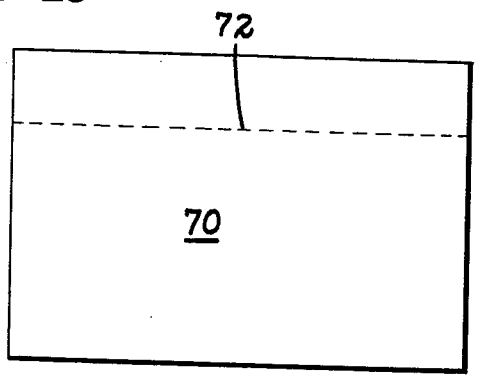
FIG. 23 is a plan view of an inner foil blank which may be incorporated as an inner wrapper in the package of FIG. 20.

The inner foil wrapper 70 is provided within the carton to enclose the cigarettes, as previously described, and this foil includes the weakened or perforated line 72 extending around its entire periphery, as shown in the blank illustration of the foil in FIG. 23. The perforations 72 are preferably located to extend across the upper end of the package approximately midway between the upper and lower ends of access opening 50. Thus, the upper section of the foil wrapper above perforation line 72 may be removed to provide access to the cigarettes, the resultant open package of cigarettes being shown in FIG. 22. The reclosable lid for the carton provides easy access to the cigarettes at all times, yet keeps them enclosed and thus relatively fresh. Furthermore, the stiff stock from which the carton component of the package is made is resistant to crushing and affords ample protection to the cigarettes during normal handling.

Thus, the present invention provides a carton having a reclosable lid which is simple and economical to manufacture and assemble, and which is particularly adaptable to use with high speed folding and packaging machines now in general use. As a specific example, the carton may be utilized in packaging operations with machines such as the AMF 3–79 standard cigarette packer without requiring any extensive modification of the machine. These machines can operate at a rate of approximately 120 packages per minute when packaging cigarettes or similar articles. The present invention, therefore, provides a carton which is readily adaptable to present day packaging operations.

Also, since the outer front panels of the cartons are continuous across the slits 30 there is no problem of registry between adjacent portions of the box portions and the lid portions of the carton when it is desired to print upon the outer surface of the blanks.

This application is a continuation-in-part of my co-pending application Serial No. 507,619 for Carton, filed May 11, 1955, now Patent No. 2,836,342.

While the method and the articles herein described constitute preferred embodiments of the invention, it is to be understood that the invention is not limited to this precise method and these forms of articles, and that changes may be made therein without departing from the scope of the invention which is defined in the appended claims.

What is claimed is:

1. A blank for forming a carton with an integral reclosable lid comprising a sheet of material scored to provide an outer member including outer front, rear, and side panels and a glue flap at one side edge of said outer member arranged side by side for folding into generally tubular form, end flaps extending independently of each other from the top and bottom edges of said outer member including front end flaps connected to said outer front panel along substantially the full width thereof for forming top and bottom walls on the carton, said outer front and side panels having a substantially continuous transverse slit extending therethrough adjacent and spaced from said top edge of said outer member defining therewith front and side walls for the lid, said outer rear panel having a transverse score line aligned with the end of said slit in the adjacent outer side panel and spaced from the top edge of said rear panel to define a lid rear wall and to provide an integral hinged connection between the lid and the main body of the carton, an inner member including inner side and front panels connected side by side, said inner side and front panels being arranged along the lower edge of said outer member in alignment with the corresponding outer front and side panels, means defining an integral folding connection between said inner member and said lower edge of said outer member providing for superimposing said inner front and side panel upon the corresponding outer front and side panels, the length of said inner panels being such that portions thereof will extend across said transverse slit and into said lid when the carton is assembled, said integral folding connection including parts extending from said inner side panels around said bottom front end flap and connected to the lower edges of said outer side panels along common fold lines, and said parts of said inner side panels and said inner front panel being separated from said bottom flap by a generally U-shaped slit in the blank.

2. A carton blank as defined in claim 1 wherein said inner side panels have aligned relieved portions therein extending to the sides of said inner front panels to provide for application of adhesive to said inner front panel only prior to folding of said inner member into face to face relation with said outer member.

3. A blank for forming a carton with an integral reclosable lid comprising a sheet of material scored to provide an outer member including outer rear, side, front, and side panels arrayed in that order, a bottom end flap joined to said outer front panel along the full width thereof, a glue flap extending from the last mentioned said side panel and adapted for adherence to an interior surface of said rear panel to retain the carton in generally tubular form, said outer front and side panels having a substantially continuous transverse slit extending therethrough adjacent and spaced from the top edge of said outer member defining therewith front and side walls for the lid, said outer rear panel having a transverse score line spaced from the top edge of said rear panel to define a lid rear wall and to provide an integral hinged connection between the lid and the main body of the carton, a three panel inner member including inner side and front panels connected side by side, means providing a fixed connection between said inner and outer members locating said inner side and front panels in alignment with the corresponding outer front and side panels and foldable for positioning said inner member in face to face relation with said outer member, said inner front and side panels being dimensioned to extend across said slits in said outer front and side panels and substantially over said lid wall providing parts thereof when folded in face to face superimposed relation therewith, said rear panel and said glue flap being arranged to extend beyond the sides of said inner member when said inner member is folded into superimposed relation on said outer member for providing single thickness edges on the superimposed blank, said fixed connection between said inner and outer members including parts extending from said inner side panels around said bottom end flap and connected to the lower edges of said outer side panels along common fold lines, and said parts of said inner side panels and said inner front panel being separated from said bottom end flap by a generally U-shaped slit in the blank.

4. A carton blank as defined in claim 3 wherein said inner side panels have aligned relieved portions therein extending to the sides of said inner front panels to provide for application of adhesive to said inner front panel only prior to folding of said inner member into face to face relation with said outer member.

5. A blank for forming a carton with an integral reclosable lid comprising a sheet of material scored to provide an outer member including outer front, rear, and side panels and a glue flap at one side edge of said outer member arranged side by side for folding into generally tubular form, end flaps extending independently of each other from the top and bottom edges of said outer member including front end flaps connected to said outer front panel along substantially the full width thereof for forming top and bottom walls on the carton, said outer front and side panels having a substantially continuous transverse slit extending therethrough adjacent and spaced from said top edge of said outer member defining therewith front and side walls for the lid, said outer rear panel having a transverse score line aligned with the end of said slit in the adjacent outer side panel and spaced from the top edge of said rear panel to define a lid rear wall and to provide an integral hinged connection between the lid and the main body of the carton, an inner member including inner side and front panels connected side by side, said inner side and front panels being arranged along the lower edge of said outer member in alignment with the corresponding outer front and side panels, means defining an integral folding connection between said inner member and said lower edge of said outer member providing for superimposing said inner front and side panels upon the corresponding outer front and side panels, the length of said inner panels being such that portions thereof will extend across said transverse slit and into said lid when the carton is assembled, said integral folding connection including a connecting flap of substantially the same width as said bottom front flap, and said connecting flap having folding connections on opposite sides thereof with said inner front panel and said bottom front flap.

6. A blank for forming a carton with an integral reclosable lid comprising a sheet of material scored to provide an outer member including outer rear, side, front, and side panels arrayed in that order, a bottom end flap joined to said outer front panel along the full width thereof, a glue flap extending from the last mentioned said side panel and adapted for adherence to an interior surface of said rear panel to retain the carton in generally tubular form, said outer front and side panels having a substantially continuous transverse slit extending therethrough adjacent and spaced from the top edge of said outer member defining therewith front and side walls for the lid, said outer rear panel having a transverse score line spaced from the top edge of said rear panel to define a lid rear wall and to provide an integral hinged connection between the lid and the main body of the carton, a three panel inner member including inner side and front panels connected side by side, means providing a fixed connection between said inner and outer members locating said inner side and front panels in alignment with the corresponding outer front and side panels and foldable for positioning said inner member in face to face relation with said outer member, said inner front and side panels being dimensioned to extend across said slits in said outer front and side panels and substantially over said lid wall providing parts thereof when folded in face to face superimposed relation therewith, said rear panel and said glue flap being arranged to extend beyond the sides of said inner member when said inner member is folded into superimposed relation on said outer member for providing single thickness edges on the superimposed blank, said fixed connection between said inner and outer members including a connecting flap of substantially the same width as said bottom end flap, and said connecting flap having folding connections on opposite sides thereof with said inner front panel and said bottom front flap.

7. A paperboard blank for a hinged cover carton comprising a front body panel, side body panels extending from each side of said front body panel, a back body panel extending from one side of one of said body panels, a bottom flap extending from the bottom edge of said front body panel, and a liner comprising front and side liner panels, said side liner panels extending from the bottom edges of said side body panels and said front liner panel extending between said side liner panels, said bottom flap being formed as a cut-out from the liner, and said liner being foldable about the bottom edges of the side body panels so that the front and side liner panels overlie the front and side body panels.

8. A paperboard blank for a hinged cover carton comprising a front body panel having two short sides and two long sides, side body panels of less width than said front body panel extending from each long side of said front body panel, a back body panel extending from one side of one of said side body panels, a bottom flap extending from the bottom edge of said front body panel, the width of said bottom flap being substantially the same as the width of said side panels, a liner extending from said bottom flap, said liner comprising a bottom panel of a width substantially the same as the width of said bottom flap, a front liner panel extending from the front edge of said bottom panel, and side liner panels extending from each side of said front liner panel, said liner being foldable about the front edge of said bottom panel so that the front and side liner panels overlie the front and side body panels, and a bottom flap separate from the liner extending from the bottom edge of one of the body panels other than the front body panel.

9. A one-piece paperboard carton comprising a front body panel, side body panels extending from each side of said front body panel, a back body panel extending from one side of one of said side body panels, a bottom flap extending from the bottom edge of said front body panel, and a liner extending from said bottom flap, said liner comprising a bottom panel, a front liner panel extending from the front edge of said bottom panel, and side liner panels extending from each side of said front liner panel, said bottom flap and said bottom panel each extending from said front body panel to said back body panel.

10. A one-piece paperboard carton comprising a body having four panels adjoining one another at vertical fold lines and forming front and back body panels, and a liner having three panels adjoining one another at vertical fold lines and forming front and side liner panels, said body and liner joined by an integral double bottom flap joining the bottom edge of the front body panel to the bottom edge of the front liner panel with the front body and liner panels in juxtaposed relation, said double bottom flap extending from said front body panel to said back body panel.

References Cited in the file of this patent

UNITED STATES PATENTS

| | | |
|---|---|---|
| 887,729 | Kirmise | May 12, 1908 |
| 1,110,175 | Giroud | Sept. 8, 1914 |
| 1,792,203 | Wakefield | Feb. 10, 1931 |
| 1,907,067 | Hartmann | May 2, 1933 |
| 2,011,438 | Daller | Aug. 13, 1935 |
| 2,151,202 | Guyer | Mar. 21, 1939 |
| 2,320,289 | Marx | May 25, 1943 |
| 2,441,445 | Ringler | May 11, 1948 |
| 2,457,107 | Verner | Dec. 21, 1948 |
| 2,473,055 | Guyer | June 14, 1949 |
| 2,577,588 | Page | Dec. 4, 1951 |
| 2,589,045 | Brooks | Mar. 11, 1952 |
| 2,672,273 | Smith | Mar. 16, 1954 |
| 2,693,298 | Palmer | Nov. 2, 1954 |
| 2,758,780 | Imbs | Aug. 14, 1956 |
| 2,836,342 | Ringler | May 27, 1958 |